(12) United States Patent
Agrawal

(10) Patent No.: US 12,032,986 B2
(45) Date of Patent: Jul. 9, 2024

(54) AUTOMATED TRAINING ENVIRONMENT SELECTION

(71) Applicant: Oracle International Corporation, Redwood Shores, CA (US)

(72) Inventor: Deepak Agrawal, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 488 days.

(21) Appl. No.: 17/490,762

(22) Filed: Sep. 30, 2021

(65) Prior Publication Data

US 2023/0101554 A1    Mar. 30, 2023

(51) Int. Cl.
  *G06F 9/50* (2006.01)
  *G06F 9/455* (2018.01)

(52) U.S. Cl.
  CPC ........ *G06F 9/45558* (2013.01); *G06F 9/5038* (2013.01); *G06F 9/505* (2013.01); *G06F 9/5072* (2013.01); *G06F 2009/4557* (2013.01)

(58) Field of Classification Search
  CPC .. G06F 9/455; G06F 9/45504; G06F 9/45533; G06F 9/45541; G06F 9/50; G06F 9/5061; G06F 9/5077; G06F 9/5005; G06F 9/5011; G06F 9/5016; G06F 9/5027
  See application file for complete search history.

(56) References Cited

U.S. PATENT DOCUMENTS

| | | | | |
|---|---|---|---|---|
| 11,550,635 | B1* | 1/2023 | Wong | G06F 9/5022 |
| 11,715,025 | B2* | 8/2023 | Wen | G06F 9/5077 |
| | | | | 706/46 |
| 11,868,227 | B2* | 1/2024 | Kuperman | G06F 11/3428 |
| 2020/0151748 | A1* | 5/2020 | Saha | G06Q 30/0202 |
| 2022/0245485 | A1* | 8/2022 | Cady | G06N 5/04 |
| 2022/0309391 | A1* | 9/2022 | Patel | G06F 16/906 |
| 2022/0357993 | A1* | 11/2022 | Toal | G06F 9/5027 |
| 2022/0398466 | A1* | 12/2022 | Wu | G06N 3/0442 |

OTHER PUBLICATIONS

Compute Shapes, Available Online at: https://docs.oracle.com/en-us/iaas/Content/Compute/References/computeshapes.htm, Accessed from Internet on Mar. 4, 2022, 22 pages.

* cited by examiner

*Primary Examiner* — Andy Ho
(74) *Attorney, Agent, or Firm* — Kilpatrick Townsend & Stockton LLP

(57) ABSTRACT

A time series forecasting system is disclosed that receives a forecast request identifying a forecast to be made for a future time point and a time series dataset to be used for making the requested forecast. The system selects a model to be used for making the requested forecast and determines a set of one or more attributes of the time series dataset. Based on the set of attributes, the system selects a compute instance either from a shared node pool or a dedicated instance having a shape to be used for training the selected model and generating a forecast. The system then generates a forecast result for the future time point using the trained model and provides the forecast result as a response to the forecast request.

20 Claims, 8 Drawing Sheets

300

| Rule | Size of dataset (attribute) | Number of columns (attribute) | Training Mode | Instance Shape |
|---|---|---|---|---|
| 1 | Size < 1MB | Max 20 | Shared | Compute Instance: Virtual Machine Shape: 8 CPUs, 120 GB memory, block storage capacity, 8.2 Gpbs maximum network bandwidth |
| 2 | Size > 1MB and <10MB | Max 100 | Dedicated | Compute Instance: Virtual Machine Shape: 1 CPU, 15 GB memory, block storage capacity, 1 Gbps maximum network bandwidth |
| 3 | Size > 10MB and less than 100 MB | Max 500 | Dedicated | Compute Instance: Virtual Machine Shape: 2 CPUs, 30 GB memory, block storage capacity, 2 Gbps maximum network bandwidth |
| 4 | Size > 100MB and less than 1 GB | Max 1000 | Dedicated | Compute Instance: Virtual Machine Shape: 8 CPUs, 120 GB memory, block storage capacity, 8.2 Gpbs maximum network bandwidth |

FIG. 3

AUTOMATED TRAINING ENVIRONMENT SELECTION

BACKGROUND

A time series or time series dataset is a sequence of data points, measured typically at successive times over a time interval. Examples of time series data include: a set of temperature values captured every day over several days, the price of a stock observed every 5 minutes, monthly sales for a corporation captured over several months, and the like. Time series forecasting refers to a set of forecasting techniques that, given a time series, uses one or more models to forecast an event or observation for a time point in the future. Time series forecasting is used in various fields such as for making economic forecasts, stock market forecasts, product sales forecasts, and so on. The models that are used for analyzing the time series data and for making the forecasts may include, for instance, machine learning models such as neural networks, linear regression models, decision trees and the like.

There are multiple machine learning models that can be used for time series forecasting. Typically, when a machine learning model is used for time series forecasting based upon some time series data, an appropriate model has to be first selected based upon the time series data to be used for the forecasting. The model then has to be trained and validated using the time series data, and after the model has reached an acceptable level of accuracy, the model is then used for forecasting for a future time point. Training a model for generating a forecast can be a challenging and time consuming process. Since there are multiple possible machine learning models that can be used, each of the multiple models has to be trained and validated before a particular model is selected. Further, given the nature of time series data, the time series data that is to be used for the forecasting keeps changing with time (e.g., time interval frequency is per minute, hours, day, week, etc.) as new data points are obtained with the passage of time. A model thus also has to be trained and re-trained frequently and/or continuously as the underlying times series data that is to be used for the forecasting changes with time.

As can be seen from the above, a large amount of time and resources are needed for training models for performing time series forecasting. Further, due to the ever changing data that is used for the forecasting, the training has to be done frequently and the models are thus ephemeral in nature. There is thus a need for making the processing, including training, related to time series forecasting faster and more efficient than is possible in existing implementations.

BRIEF SUMMARY

The present disclosure relates generally to time series forecasting. More specifically, but not by way of limitation, this disclosure describes a forecasting service that provides improved capabilities for training models for performing time series forecasting such that the computing resources required for training the models are optimized and the time required for training the models is minimized.

In certain embodiments, a forecasting service system is disclosed. The system receives a forecast request identifying a forecast to be made for a future time point. The forecast request includes a time series dataset to be used for making the requested forecast. The time series dataset comprises a set of data points where each data point includes a value and an associated time point. The system selects a model to be used for making the requested forecast. The system then determines a set of attributes of the time series dataset and based on the set of attributes, selects a compute instance having a shape to be used for training the selected model to be used for making the requested forecast. The system then trains the selected model using the compute instance having the selected shape and the time series dataset to generate a trained model.

In certain examples, the selected model for making the requested forecast is determined based on the time series dataset to be used for making the requested forecast and a set of model selection rules. In certain examples, the set of attributes of the training dataset include a size of the time series dataset and a number of columns in the time series dataset. In certain examples, the compute instance having the shape is selected based on the set attributes of the training dataset and a set of compute instance shape rules.

In certain examples, the system determines whether the selected model is to be trained using a compute instance that is dedicated for training the model or using a compute instance that is sharable for training multiple models including the model. Upon determining that the model is to be trained using a compute instance that is dedicated for training the model, the system provisions a new compute instance having the selected shape and uses the new compute instance exclusively for training the model. Upon determining that the model is to be trained using a compute instance that is sharable, the system identifies, from a set of pre-provisioned compute instances, a particular compute instance having the selected shape and uses the particular compute instance for training the model.

In certain examples, the shape of the compute instance represents a set of resources allocated to the compute instance. The set of resources comprise central processing units (CPUs), memory, block storage capacity and network bandwidth allocated to the computing instance. In certain examples, the compute instance is a virtual machine, a bare metal instance or a container.

In certain examples, the system generates a forecast result for the future time point using the trained model and provides the forecast result as a response to the forecast request.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 3 illustrates a table depicting rules for selecting a compute instance having a particular shape to be used for training a selected model, according to certain embodiments.

DETAILED DESCRIPTION

Figure 1:
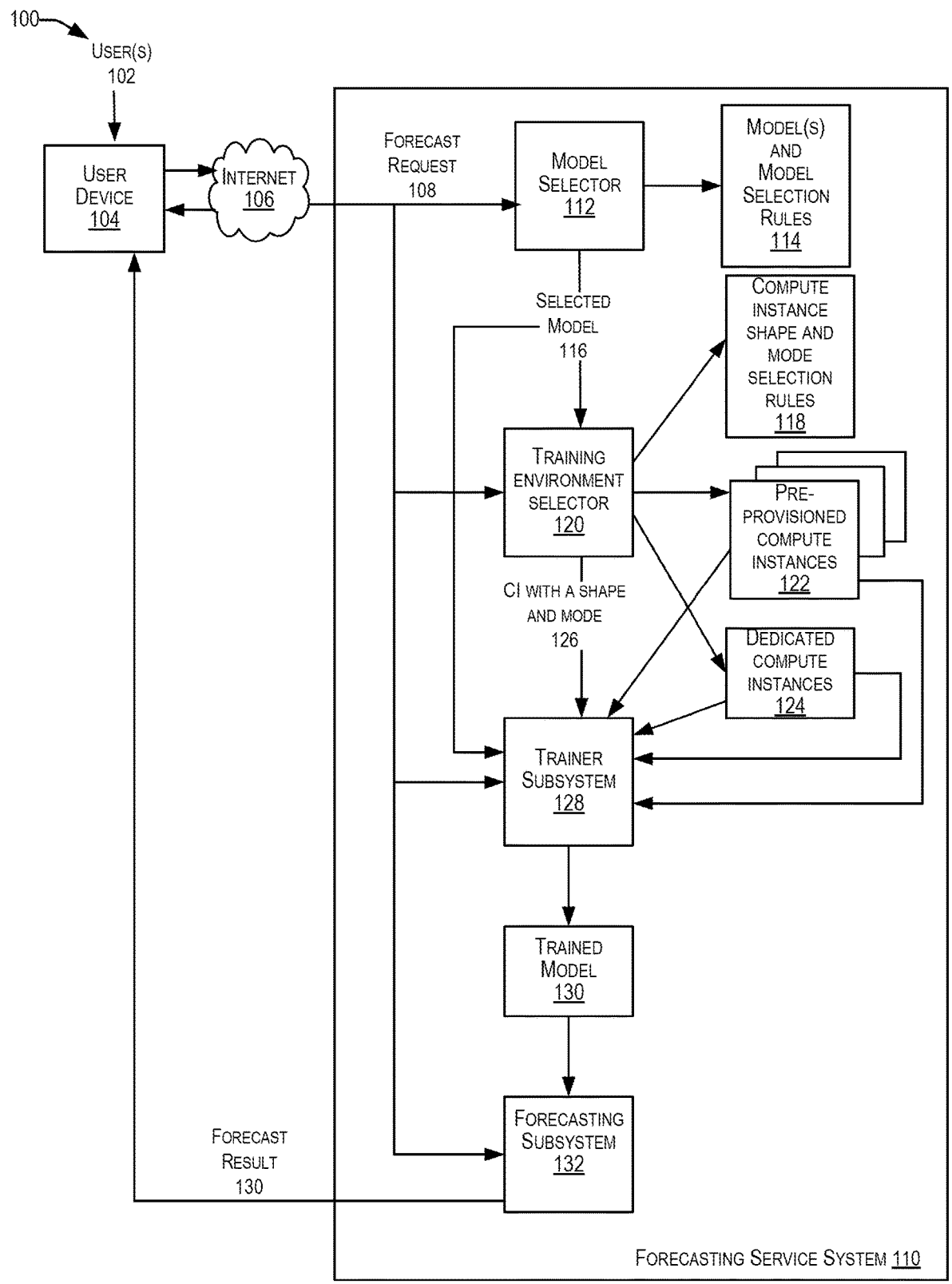
FIG. 1 depicts a computing environment that includes a forecast service system (FSS) that includes capabilities for determining a training environment for training a model that is to be used for generating a forecast, according to certain embodiments.

The present disclosure relates generally to time series forecasting. More specifically, but not by way of limitation, this disclosure describes a forecasting service that provides improved capabilities for training models for performing time series forecasting such that the computing resources required for training the models are optimized and the time required for training the models is minimized.

As previously described, training a model for generating a forecast can be a challenging and time consuming process. Further, given the nature of time series data, the time series data that is to be used for the forecasting keeps changing with time (e.g., time interval frequency is per minute, hours, day, week, etc.) as new data points are obtained with the passage of time. A model thus also has to be trained and re-trained frequently and/or continuously as the underlying times series data that is to be used for the forecasting changes with time. The training and re-training of models typically requires significant time and computing resources to be allocated to perform the training. Provisioning resources required for training these models can be a time consuming process and can add a significant amount of latency to the processing, including the training time, required for training these models. This latency can affect user experience and result in reduced customer satisfaction.

The system described in the present disclosure provides several technical advancements and/or improvements over conventional training and forecasting systems by determining, based on the attributes of the time series dataset, a training environment (i.e., a compute instance having a particular shape) for training a model that is to be used for generating a forecast for a time series dataset. A compute instance may represent a virtual machine, a bare metal instance, a container or the like that may be used for training a model. The "shape" of a compute instance may represent a certain set of resources (e.g., CPUs, memory, local disk capacity, network bandwidth and other resources) allocated to the compute instance. Upon selecting a particular training environment, the system determines, whether the model is to be trained using a compute instance that is dedicated for exclusively training the model or whether the model is to be trained using a compute instance that is sharable for training multiple models including the model. If the system determines that a "shared" compute instance is to be used for the training, it identifies, from a pre-provisioned set of compute instances, an available compute instance having a particular shape for training the model. If the system determines that a dedicated compute instance is to be used for the training, it provisions a new compute instance having a particular shape. The system uses the compute instance having the particular shape to train the model using the time series dataset and the uses the trained model to predict a forecast result for a requested forecast.

By determining an appropriate training environment (i.e., a compute instance having a particular shape) for training a model to be used for generating a forecast based on the attributes of the time series dataset and flexibly using either a pre-provisioned instance or a dedicated instance to perform the training, the disclosed system is able to optimally and efficiently utilize computing resources required for training the model and is able to reduce the training time required to train the model. Additionally, by using pre-provisioned compute instances with certain shapes and by being able to re-use the pre-provisioned compute instances multiple times, the disclosed system optimizes resource utilization required for training and improves the efficiency of processing and training related to time series forecasting.

Referring now to the drawings, FIG. 1 depicts a computing environment that includes a forecasting service system (FSS) that includes capabilities for determining a training environment for training a model that is to be used for generating a forecast. The FSS 110 may be implemented by one or more computing systems that execute computer-readable instructions (e.g., code, program) to implement the FSS 110. As depicted in FIG. 1, the FSS 110 includes various systems and subsystems including a model selector 112, a training environment selector 120, trainer subsystem 128 and a forecasting subsystem 132. Portions of data or information used by or generated by the systems and subsystems 112, 120, 128 and 132 as part of its processing may be stored in one or more persistent memory data stores such as a model(s) and model selection rules data store 114 and a compute instance shape and mode selection rules data store 118. The systems and subsystems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

The FSS 110 may be implemented in various different configurations. In certain embodiments, the FSS 110 may be implemented on one or more servers of a cloud provider network and its training and forecasting services may be provided to subscribers of cloud services on a subscription basis. Computing environment 100 depicted in FIG. 1 is merely an example and is not intended to unduly limit the scope of claimed embodiments. One of ordinary skill in the art would recognize many possible variations, alternatives, and modifications. For example, in some implementations, the FSS 110 can be implemented using more or fewer subsystems than those shown in FIG. 1, may combine two or more subsystems, or may have a different configuration or arrangement of subsystems.

In certain embodiments, the FSS 110 provides a fast and reliable service for determining a training environment for training a model to be used for generating a forecast for a time series dataset. The time series dataset may be received as part of a forecast request 108 from a user 102 of the FFS 110. In certain examples, the forecast request 108 identifies a forecast to be made for a future time point and includes a times series dataset to be used for making the requested forecast. A time series dataset comprises a sequence of data points recorded in time order. Each data point in the time series dataset comprises a value (e.g., an observed value)

and an associated time. Additional details and examples of forecast requests and time series datasets are provided in FIG. 2.

As depicted in FIG. 1, a forecast request (e.g., 108) may be received from a user 102 via a user device 104 that is communicatively coupled to the FFS 110 possibly via a public network 106 (e.g., the Internet). The user 102 may represent a user of an entity such as a customer (e.g., an organization, an enterprise, or an individual) who subscribes to the services provided by the FFS 110. The user device 104 may be of various types, including but not limited to, a mobile phone, a tablet, a desktop computer, and the like. The user 102 may interact with the FFS 110 using a browser executed by the user device 104. For example, the user may use a user interface (UI) (which may be a graphical user interface (GUI)) of the browser executed by the user device to interact with the FFS 110.

In certain embodiments, the forecast request 108 is received by a model selector 112 in the FSS 110. The model selector 112 selects a model (e.g., 116) to be used for making the requested forecast. To select a particular model, the model selector 112 may utilize rules stored in the model(s) and model selection rules data store 114. The rules define criteria for determining the type of model to be used for generating a forecast based on the time series dataset received as part of the forecast request. For instance, for a time series dataset that comprises a sequence of data points that relate to temperature measurements, the model selector 112, using the rules stored in 114, may select a first type of model whereas for a time series dataset that comprises a sequence of data points that relate to stock price values, the model selector 112 may select a different type of model. Additional details of the information stored in the data store 114 and the processing performed by the model selector 112 to select a model to be used for generating a forecast are described in FIG. 2.

Upon selecting a model (e.g., 116) as described above, the model selector 112 provides the selected model to a training environment selector 120 in the FSS 110. The training environment selector 120 then selects a particular training environment to be used for training the selected model. As previously noted, a training environment may be represented by a set of one or more compute instances having particular shapes that are used for training the selected model. A compute instance may represent a virtual machine, a bare metal instance, a container or the like. The "shape" of a compute instance may represent a certain set of resources (e.g., CPUs, memory, local disk capacity, network bandwidth and other resources) allocated to the compute instance. Examples of compute instances and their shapes are described in detail in FIG. 3.

In a certain implementation, the selection of a particular training environment (i.e., a compute instance having a particular shape) by the training environment selector 120 is performed based on the forecast request 108 and a set of one or more rules stored in the compute instance shape and mode selection rules data store 118. For instance, if the forecast request includes a time series dataset having a set of attributes with a first set of associated values, the training environment selector 120, based on the rules, may select a first training environment to be used for training the selected model whereas for a forecast request that includes a time series dataset having a set of attributes with a different set of associated values, the training environment selector 120 may select a different training environment. Additional details of the processing performed by the training environment selector 120 to select a training environment is described in FIG. 2.

Upon selecting a training environment (i.e., a compute instance having a particular shape) as described above, the training environment selector 120 then determines a mode (e.g., shared mode or dedicated mode) for using the selected compute instance for training the model. In certain examples, the training environment selector 120 may utilize the mode selection rules stored in the data store 118 to determine the mode for using the compute instance having a particular shape. If the training environment selector 120 determines that the compute instance is to be used in a "shared" mode, it identifies, from a pre-provisioned set of compute instances 122, an available compute instance having the particular shape for training the model. If the training environment selector 120 determines that the selected compute instance is to be used in a "dedicated" mode, it provisions a new compute instance having the particular shape from the set of dedicated compute instances 124. Additional details of the processing performed by the training environment selector 120 to select a compute instance having a shape and to select a mode for using the compute instance is described in FIG. 2.

After selecting either a pre-provisioned compute instance or a dedicated compute instance as described above, the training environment selector 120 provides a pointer to the selected compute instance having the shape and the mode for using the selected compute instance to the trainer subsystem 128. The trainer subsystem 128 accesses the selected compute instance from either the pre-provisioned compute instances 122 or the dedicated compute instances 124 to train the selected model using the time series dataset received as part of the forecast request. The forecasting subsystem 132 uses the trained model to predict a forecast result 130 for the forecast requested, where the forecast result includes a value predicted for the future time point identified in the forecast request. The forecasting subsystem 132 then communicates the forecast result 130 to the requesting user 102. By selecting a training environment (i.e., a compute instance having a shape) based on the attributes of the time series dataset and determining a mode (shared or dedicated) for using the compute instance for the training, the FSS 110 described in the present disclosure enables the processing, including training, related to time series forecasting to be performed in a cost effective, efficient, and time sensitive manner. Additional details of the processing performed by the systems and subsystems depicted in FIG. 1 to determine a training environment for training a model to be used for generating a forecast for a time series dataset is described below with respect to the flowchart depicted in FIG. 2 and the accompanying description.

Figure 2:
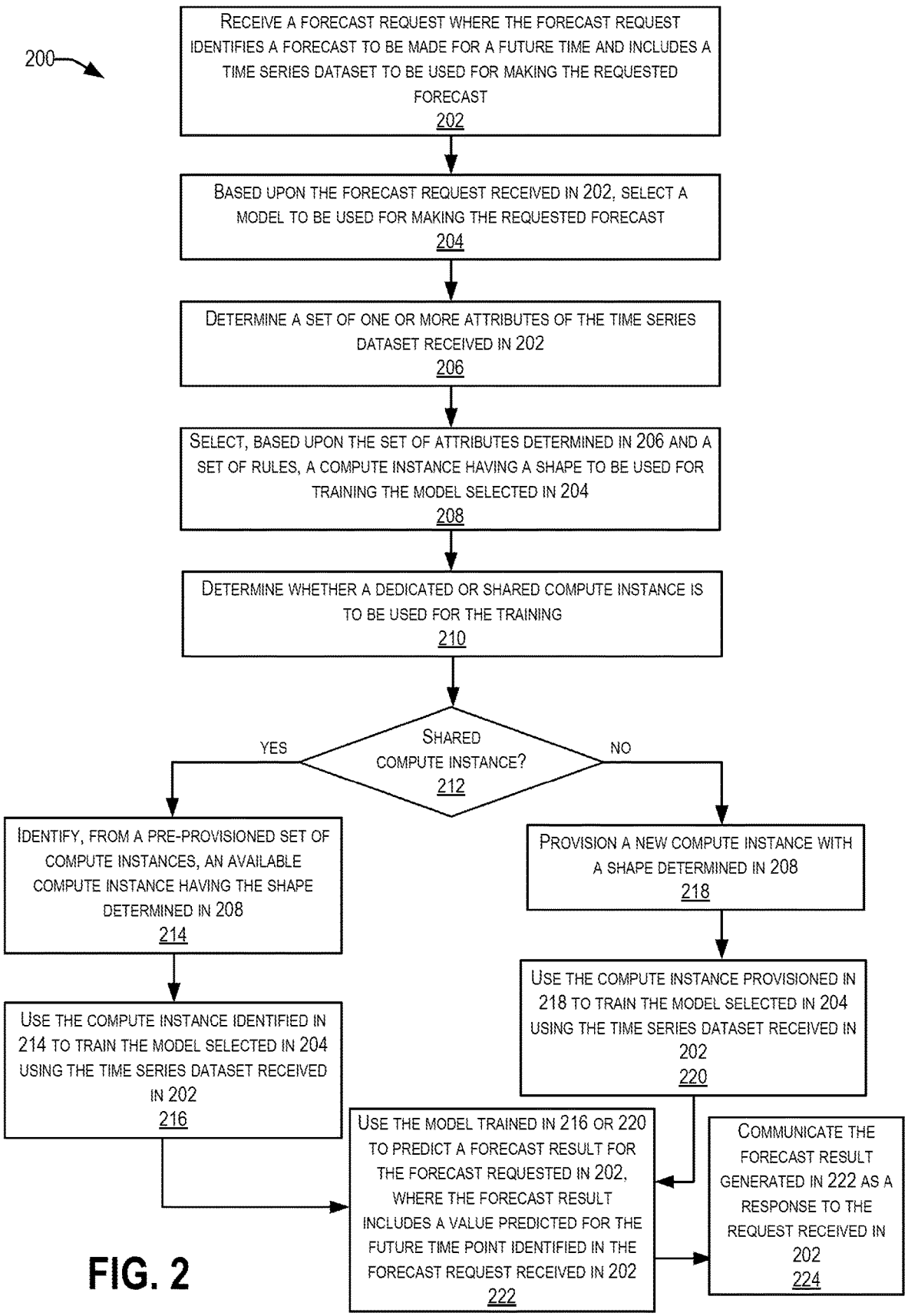
FIG. 2 depicts an example of a process 200 by which the FFS shown in FIG. 1 determines a training environment for training a model to be used for generating a forecast for a time series dataset, according to certain embodiments.

FIG. 2 depicts an example of a process 200 by which the FFS shown in FIG. 1 determines a training environment for training a model to be used for generating a forecast for a time series dataset, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by the model selector 112, the training environment selector 120, the trainer subsystem 128 and the forecasting subsystem 132 in the FSS 110.

The processing depicted in FIG. 2 may be initiated when, at block 202, a forecast request (e.g., 108) is received for processing by the model selector 112. As previously described, the forecast request 108 identifies a forecast to be made for a future point in time and includes a times series dataset to be used for making the requested forecast. A time series dataset comprises a sequence of data points recorded in time order. Each data point in the time series dataset comprises a value (e.g., an observed value) and an associated time. By way of example, a time series dataset may comprise a sequence of data points, where the data points consist of gasoline price values measured at successive time points over a particular time interval. A forecast request may identify a forecast to be made to predict the price of gasoline at a future time point using the time series dataset. An example of a time series dataset comprising gasoline price values measured at different times (e.g., different days) over a time interval (e.g., a week) is shown in table-1 below:

TABLE 1

| Time (in Days) | Price |
| --- | --- |
| 1 | 2.75 |
| 2 | 2.29 |
| 3 | 3.07 |
| 4 | 2.81 |
| 5 | 2.95 |
| 6 | 2.68 |
| 7 | 2.52 |

In the example shown above, table-1 is organized into one or more columns including a time column and a price value column. The time column identifies the different time points (i.e., different days) during which the gasoline prices were measured. The price column identifies the price of gasoline on a particular day. The illustrated table is merely an example and is not intended to unduly limit the scope of claimed embodiments. One of ordinary skill in the art would recognize many possible variations, alternatives, and modifications. For example, in some implementations, the table can be implemented using more columns than those shown in FIG. 1, may combine two or more columns of information, or may have different columns than shown in the illustration.

Table-2 shown below illustrates another example of a time series dataset. In this example, the time series dataset comprises a sequence of data points, where the data points consist of product sales measurements made over a time interval (e.g., over a week). A first set of values/measurements in the time series dataset comprise the number of a particular type of product (e.g., ice creams) sold on a particular day and a second set of values/measurements comprise the temperature (e.g., in Fahrenheit) measured on that day. A forecast request may identify a forecast to predict the number of ice creams sold at a future point in time (i.e., on day 8) using the time series dataset.

TABLE 2

| Time Point (in days) | Number of ice creams sold | Temperature |
| --- | --- | --- |
| 1 | 185 | 83 |
| 2 | 168 | 71 |
| 3 | 171 | 64 |
| 4 | 176 | 69 |
| 5 | 176 | 69 |
| 6 | 172 | 64 |
| 7 | 165 | 68 |

In the example shown above, table-2 is organized into one or more columns including a time column, a number of ice creams sold column and a temperature column. The illustrated table is merely an example and is not intended to unduly limit the scope of claimed embodiments. One of ordinary skill in the art would recognize many possible variations, alternatives, and modifications. For example, in some implementations, the table can be implemented using more columns than those shown in FIG. 1, may combine two or more columns of information, or may have different columns than shown in the illustration. Other examples of time series datasets may include, but are not limited to, a sequence of data points that represent stock prices, a sequence of data points that represent processor utilization of a server over a fixed window of time where each respective data point in the dataset indicates a respective measured utilization rate at a different point in time within the fixed window, and the like.

At block 204, based on the forecast request received in block 202, the model selector 112 selects a model (e.g., 116) to be used for making the requested forecast. In certain examples, the model selector 112 may utilize a set of model selection rules stored in the model(s) and model selection rules data store 114 to determine the type of model to be used for generating a forecast. The model selection rules may be defined and/or derived by a user (e.g., an administrator) of the FFS 110 based on forecast requests previously received and processed by the FFS 110. In certain examples, the model selection rules specify criteria for selecting a type of model to be used for generating a forecast based on the time series dataset that is received as part of the forecast request. By way of example, for a forecast request that includes a time series dataset comprising a sequence of stock price values measured at successive times over a time interval, a model selection rule may specify that a model of a first type (e.g., a Linear Regression Model) be selected to generate a forecast result (i.e., a prediction of the stock price at a future point in time). For a forecast request that includes a time series dataset comprising weather measurements, a different model selection rule may be specified that defines that a model of a second type (e.g., an Auto Regressive Model) be used to generate a forecast result (i.e., a prediction of the weather at a future point in time).

The model(s) and model selection rules data store 114 may additionally include information about available models that may be used for analyzing different time series datasets received as part of forecast requests. These models may include, but are not limited to, machine learning models such as neural networks, regression models (such as linear models, polynomial models, regression models etc.), decision trees, autoregressive (AR) models, moving average (MA) models, simple moving average (SMA) models, autoregressive moving average (ARMA) models, non-machine learning models such as statistical models and the like.

Upon selecting a model (e.g., 116) as described in block 204, the model selector 112 provides the selected model to a training environment selector 120 in the FSS 110. The training environment selector 120 then selects a particular training environment to be used for training the selected model. As previously described, a training environment may be represented by a set of one or more compute instances having particular shapes that are used for training the selected model. A compute instance may represent a virtual machine, a bare metal instance, a container or the like. The "shape" of a compute instance may represent a certain set of resources (e.g., CPUs, memory, local disk capacity, network bandwidth and other resources) allocated to the compute instance. As part of the processing performed by the training environment selector 120 to select a particular training environment, at block 206, the training environment selector 120 determines a set of one or more attributes of the time series dataset received in 202. In certain examples, the attributes may include, but are not limited to, a size of the dataset, a number of columns in the dataset and so on.

At block 208, based on the set of one or more attributes determined in block 206, the training environment selector 120 selects a training environment (i.e., a compute instance having a shape) to be used for training the model selected in 204. In certain examples, the training environment selector 120 utilizes a set of compute instance shape rules stored in the data store 118 to select the shape of the compute instance to be used for training the model. The compute instance shape rules specify criteria for selecting a shape for a compute instance based on the attributes of the time series dataset. For instance, a first compute instance shape rule may specify that for a forecast request that includes a time series dataset whose dataset size is less than 1 MB and comprises 20 columns, a compute instance having a first shape is to be selected for training the selected model. A second compute instance shape rule may specify that for a forecast request that includes a time series dataset whose dataset size is greater than 1 MB and comprises more than 20 columns, a compute instance with a different shape is to be selected for training the selected model. Additional details of the implementation of compute instance rules for selecting a compute instance having a shape are described in the table shown in FIG. 3.

At block 210, the training environment selector 120 determines whether the selected model is to be trained using a compute instance that is dedicated for exclusively training the model or whether the selected model is to be trained using a compute instance that is sharable for training multiple models including the model. To make this determination, the training environment selector 120 utilizes mode selection rules stored in the data store 118 for selecting a mode (e.g., shared or dedicated) for using the selected compute instance having the particular shape (determined in block 208). For instance, the mode selection rules may specify that for compute instance having a first shape, the compute instance is to be used in a "shared" mode whereas for a compute instance having a second shape, the compute instance is to be used in a "dedicated" mode. In certain examples, a "shared" compute instance can additionally be utilized to service different forecast requests which may be received from the same customer or from different customers. A "dedicated" compute instance may be used to service a single request from a customer of the FFS 110. Additional examples of compute instance rules and mode selection rules for selecting compute instances are described in the table shown in FIG. 3.

FIG. 3 illustrates a table depicting rules for selecting a compute instance having a particular shape to be used for training a selected model, according to certain embodiments. The information depicted in table 300 may be derived based on the compute instance shape and mode selection rules stored in the data store 118 depicted in FIG. 1. The table 300 may be stored in the data store 118 and used by the training environment selector 120 to select a particular training environment to be used for training the selected model. In the example table 300 shown in FIG. 3, the table is organized into one or more columns including a rules column, a first attribute column that relates to the size of the dataset, a second attribute column that relates to the number of columns, a training mode column and a compute instance shape column. The illustrated table 300 shown in FIG. 3 is merely an example and is not intended to unduly limit the scope of claimed embodiments. One of ordinary skill in the art would recognize many possible variations, alternatives, and modifications. For example, in some implementations, the table can be implemented using more or fewer columns than those shown in FIG. 1, may combine two or more columns of information, or may have different columns than shown in the illustration.

By way of example, a first compute instance shape and mode selection rule (rule 1) may specify that for a time series dataset having a dataset size of less than 1 MB and a maximum number of 20 columns, a compute instance (e.g., a virtual machine) having a first shape is to be used/selected for training the model, where the first shape represents a certain set of resources (e.g., 8 CPUs, 120 GB memory, block storage capacity, 8.2 Gpbs maximum network bandwidth) allocated to the virtual machine. Rule 1 additionally specifies that the compute instance with the selected shape is to be used in a "shared" mode.

A second compute instance shape and mode selection rule (rule 2) may specify that for a time series dataset having a dataset size of greater than 1 MB but less than 10 MB and a maximum number of 100 columns, a compute instance (e.g., a virtual machine) having a second shape is to be used/selected for training the model, where the second shape represents a certain set of resources (e.g., 1 CPU, 15 GB memory, block storage capacity, 1 Gbps maximum network bandwidth) allocated to the virtual machine. Rule 2 additionally specifies that the compute instance with the selected shape is to be used in a "dedicated" mode.

A third compute instance shape and mode selection rule (rule 3) may specify that for a time series dataset having a dataset size of greater than 10 MB but less than 100 MB and a maximum number of 500 columns, a compute instance (e.g., a virtual machine) having a third shape is to be used/selected for training the model, where the third shape represents a certain set of resources (e.g., 2 CPUs, 30 GB memory, block storage capacity, 2 Gbps maximum network bandwidth) allocated to the virtual machine. Rule 3 additionally specifies that the compute instance with the selected shape is to be used in a "dedicated" mode.

Various additional rules may be specified for selecting a compute instance having a particular shape to be used for training a selected model. As depicted in table 300, a fourth compute instance shape and mode selection rule (rule 4) may specify that for a time series dataset having a dataset size of greater than 100 MB but less than 1 GB and has a maximum number of 1000 columns, a compute instance (e.g., a virtual machine) having a fourth shape is to be used/selected for training the model, where the fourth shape represents a certain set of resources (e.g., 8 CPUs, 120 GB memory, block storage capacity, 8.2 Gbps maximum network bandwidth) allocated to the virtual machine. Rule 4 additionally specifies that the compute instance with the selected shape is to be used in a "dedicated" mode. For a dataset size that is greater than 1 GB and having no limit on the number of columns (not shown in table 300), a compute instance shape and mode selection rule (rule 5) may specify that a compute instance (e.g., a virtual machine) having a fifth shape is to be used/selected for training the model, where the fifth shape represents a certain set of resources (e.g., 6 CPUs, 16 GB GPU, 90 CPU memory, block storage, 4 Gpbs maximum network bandwidth) allocated to the virtual machine. Rule 5 may additionally specify that the compute instance with the selected shape is to be used in a "dedicated" mode.

Returning to the discussion of FIG. 2, at block 212, if the training environment selector 120 determines that a shared compute instance is to be used for training the model, then at block 214, the training environment selector 120 identifies from a pre-provisioned set of compute instances 122, an available compute instance having the shape determined in block 208. At block 216, the training environment selector 120 uses the compute instance identified in block 214 to train the model selected in block 204 using the time series dataset received in 202. At block 212, if the training environment selector 120 determines that a dedicated compute instance is to be used for training the model, then at block 218, it provisions a new compute instance with the shape determined in 208. At block 220, the trainer subsystem 128 uses the compute instance provisioned in 218 to exclusively train the model selected in 204 using the time series dataset received in 202.

At block 222, the forecast subsystem 132 uses the model trained in block 216 or in block 220 to predict a forecast result for the forecast requested in 202. In certain examples, the forecast result includes a value predicted for the future time point identified in the forecast request received in 202. At block 224, the forecast subsystem 132 communicates the forecast result generated in 222 as a response to the request received in 202. By way of example, for a forecast request that comprises a time series dataset corresponding to a sequence of stock price values measured at successive times over a time interval, a forecast result may predict the stock price at a future point in time. For a forecast request that comprises a time series dataset corresponding to weather measurements, a forecast result may predict weather at a future point in time.

By determining an appropriate training environment (i.e., a compute instance having a particular shape) for training a model to be used for generating a forecast based on the attributes of the time series dataset and flexibly using either a pre-provisioned instance or a dedicated instance to perform the training, the disclosed system is able to optimally and efficiently utilize computing resources required for training the model and is able to reduce the training time required to train the model. Additionally, by using pre-provisioned compute instances with certain shapes and being able to re-use these pre-provisioned compute instances multiple times, the disclosed system optimizes resource utilization required for training and improves the efficiency of processing and training related to time series forecasting.

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 4:
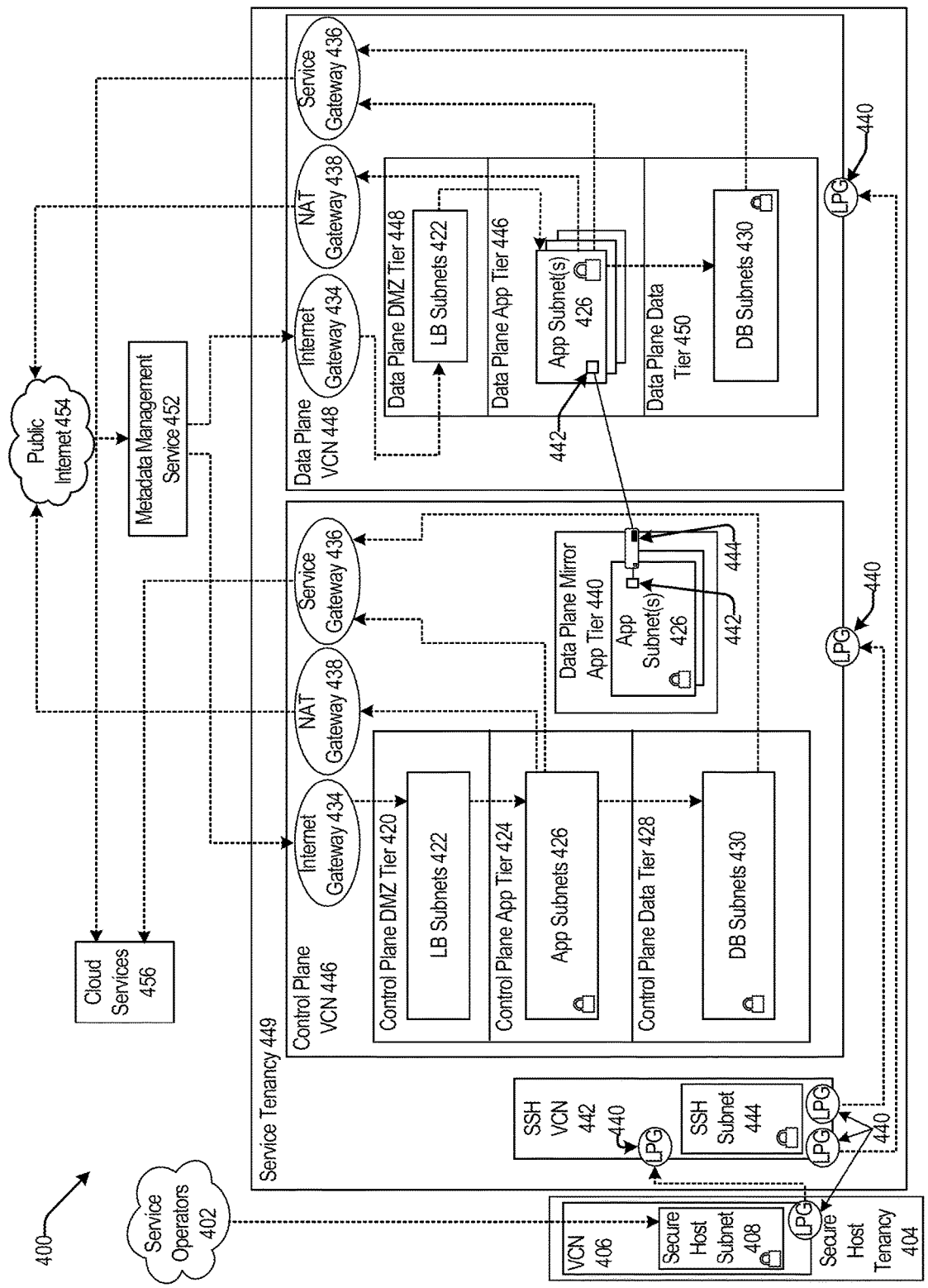
FIG. 4 is a block diagram illustrating one pattern for implementing a cloud infrastructure as a service system, according to at least one embodiment.

FIG. 4 is a block diagram 400 illustrating an example pattern of an IaaS architecture, according to at least one embodiment. Service operators 402 can be communicatively coupled to a secure host tenancy 404 that can include a virtual cloud network (VCN) 406 and a secure host subnet 408. In some examples, the service operators 402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 406 and/or the Internet.

The VCN 406 can include a local peering gateway (LPG) 410 that can be communicatively coupled to a secure shell (SSH) VCN 412 via an LPG 410 contained in the SSH VCN 412. The SSH VCN 412 can include an SSH subnet 414, and the SSH VCN 412 can be communicatively coupled to a control plane VCN 416 via the LPG 410 contained in the control plane VCN 416. Also, the SSH VCN 412 can be communicatively coupled to a data plane VCN 418 via an LPG 410. The control plane VCN 416 and the data plane VCN 418 can be contained in a service tenancy 419 that can be owned and/or operated by the IaaS provider.

The control plane VCN 416 can include a control plane demilitarized zone (DMZ) tier 420 that acts as a perimeter network (e.g., portions of a corporate network between the corporate intranet and external networks). The DMZ-based servers may have restricted responsibilities and help keep breaches contained. Additionally, the DMZ tier 420 can include one or more load balancer (LB) subnet(s) 422, a control plane app tier 424 that can include app subnet(s) 426, a control plane data tier 428 that can include database (DB) subnet(s) 430 (e.g., frontend DB subnet(s) and/or backend DB subnet(s)). The LB subnet(s) 422 contained in the control plane DMZ tier 420 can be communicatively coupled to the app subnet(s) 426 contained in the control plane app tier 424 and an Internet gateway 434 that can be contained in the control plane VCN 416, and the app subnet(s) 426 can be communicatively coupled to the DB subnet(s) 430 contained in the control plane data tier 428 and a service gateway 436 and a network address translation (NAT) gateway 438. The control plane VCN 416 can include the service gateway 436 and the NAT gateway 438.

The control plane VCN 416 can include a data plane mirror app tier 440 that can include app subnet(s) 426. The app subnet(s) 426 contained in the data plane mirror app tier 440 can include a virtual network interface controller (VNIC) 442 that can execute a compute instance 444. The compute instance 444 can communicatively couple the app subnet(s) 426 of the data plane mirror app tier 440 to app subnet(s) 426 that can be contained in a data plane app tier 446.

The data plane VCN 418 can include the data plane app tier 446, a data plane DMZ tier 448, and a data plane data tier 450. The data plane DMZ tier 448 can include LB subnet(s) 422 that can be communicatively coupled to the app subnet(s) 426 of the data plane app tier 446 and the Internet gateway 434 of the data plane VCN 418. The app subnet(s) 426 can be communicatively coupled to the service gateway 436 of the data plane VCN 418 and the NAT gateway 438 of the data plane VCN 418. The data plane data tier 450 can also include the DB subnet(s) 430 that can be communicatively coupled to the app subnet(s) 426 of the data plane app tier 446.

The Internet gateway 434 of the control plane VCN 416 and of the data plane VCN 418 can be communicatively coupled to a metadata management service 452 that can be communicatively coupled to public Internet 454. Public Internet 454 can be communicatively coupled to the NAT gateway 438 of the control plane VCN 416 and of the data plane VCN 418. The service gateway 436 of the control plane VCN 416 and of the data plane VCN 418 can be communicatively couple to cloud services 456.

In some examples, the service gateway 436 of the control plane VCN 416 or of the data plane VCN 418 can make application programming interface (API) calls to cloud services 456 without going through public Internet 454. The API calls to cloud services 456 from the service gateway 436 can be one-way: the service gateway 436 can make API calls to cloud services 456, and cloud services 456 can send requested data to the service gateway 436. But, cloud services 456 may not initiate API calls to the service gateway 436.

In some examples, the secure host tenancy 404 can be directly connected to the service tenancy 419, which may be otherwise isolated. The secure host subnet 408 can communicate with the SSH subnet 414 through an LPG 410 that may enable two-way communication over an otherwise isolated system. Connecting the secure host subnet 408 to the SSH subnet 414 may give the secure host subnet 408 access to other entities within the service tenancy 419.

The control plane VCN 416 may allow users of the service tenancy 419 to set up or otherwise provision desired resources. Desired resources provisioned in the control plane VCN 416 may be deployed or otherwise used in the data plane VCN 418. In some examples, the control plane VCN 416 can be isolated from the data plane VCN 418, and the data plane mirror app tier 440 of the control plane VCN 416 can communicate with the data plane app tier 446 of the data plane VCN 418 via VNICs 442 that can be contained in the data plane mirror app tier 440 and the data plane app tier 446.

In some examples, users of the system, or customers, can make requests, for example create, read, update, or delete (CRUD) operations, through public Internet 454 that can communicate the requests to the metadata management service 452. The metadata management service 452 can communicate the request to the control plane VCN 416 through the Internet gateway 434. The request can be received by the LB subnet(s) 422 contained in the control plane DMZ tier 420. The LB subnet(s) 422 may determine that the request is valid, and in response to this determination, the LB subnet(s) 422 can transmit the request to app subnet(s) 426 contained in the control plane app tier 424. If the request is validated and requires a call to public Internet 454, the call to public Internet 454 may be transmitted to the NAT gateway 438 that can make the call to public Internet 454. Memory that may be desired to be stored by the request can be stored in the DB subnet(s) 430.

In some examples, the data plane mirror app tier 440 can facilitate direct communication between the control plane VCN 416 and the data plane VCN 418. For example, changes, updates, or other suitable modifications to configuration may be desired to be applied to the resources contained in the data plane VCN 418. Via a VNIC 442, the control plane VCN 416 can directly communicate with, and can thereby execute the changes, updates, or other suitable modifications to configuration to, resources contained in the data plane VCN 418.

In some embodiments, the control plane VCN 416 and the data plane VCN 418 can be contained in the service tenancy 419. In this case, the user, or the customer, of the system may not own or operate either the control plane VCN 416 or the data plane VCN 418. Instead, the IaaS provider may own or operate the control plane VCN 416 and the data plane VCN 418, both of which may be contained in the service tenancy 419. This embodiment can enable isolation of networks that may prevent users or customers from interacting with other users', or other customers', resources. Also, this embodiment may allow users or customers of the system to store databases privately without needing to rely on public Internet 454, which may not have a desired level of threat prevention, for storage.

In other embodiments, the LB subnet(s) 422 contained in the control plane VCN 416 can be configured to receive a signal from the service gateway 436. In this embodiment, the control plane VCN 416 and the data plane VCN 418 may be configured to be called by a customer of the IaaS provider without calling public Internet 454. Customers of the IaaS provider may desire this embodiment since database(s) that the customers use may be controlled by the IaaS provider and may be stored on the service tenancy 419, which may be isolated from public Internet 454.

Figure 5:
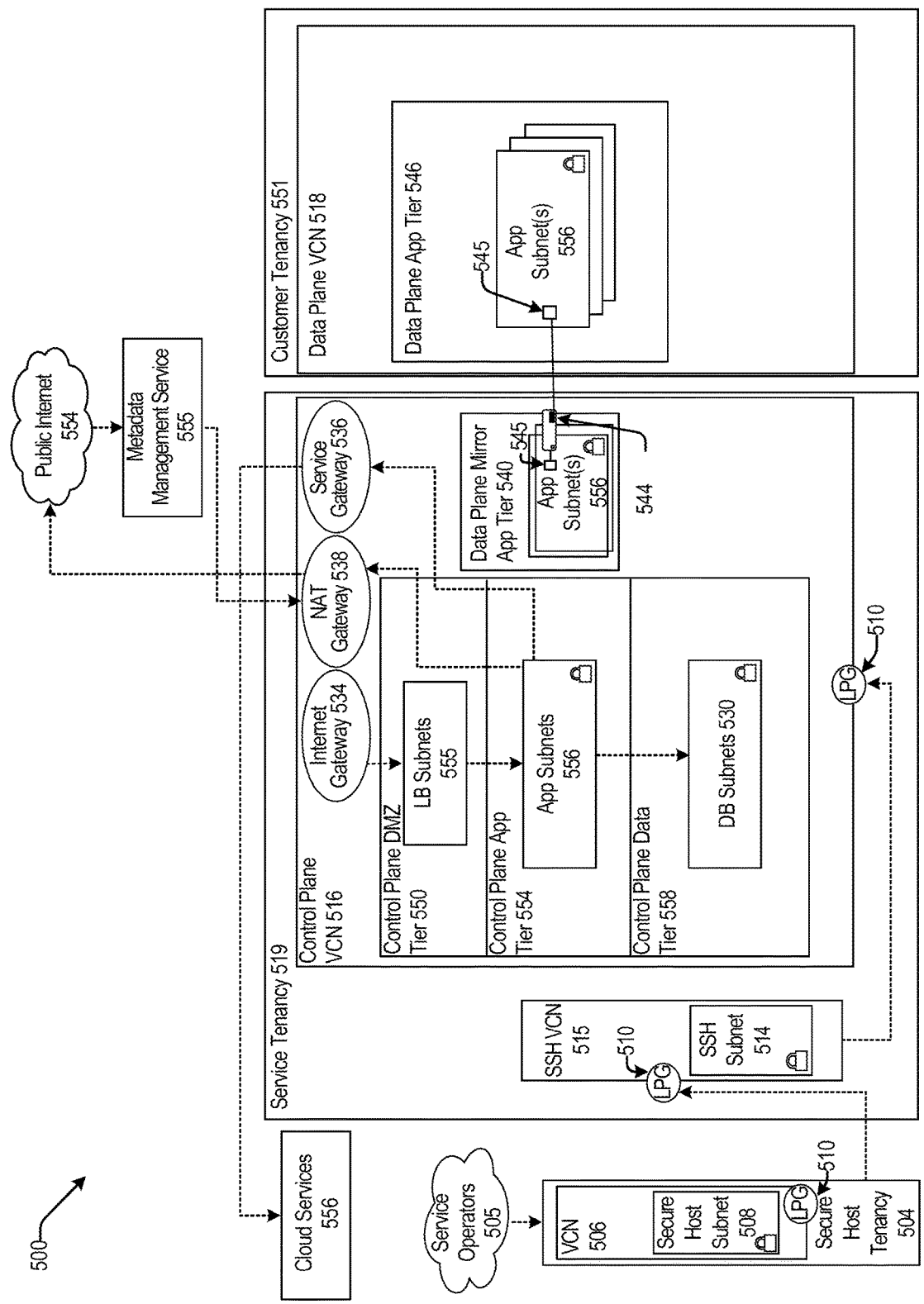
FIG. 5 is a block diagram illustrating another pattern for implementing a cloud infrastructure as a service system, according to at least one embodiment.

FIG. 5 is a block diagram 500 illustrating another example pattern of an IaaS architecture, according to at least one embodiment. Service operators 502 (e.g. service operators 402 of FIG. 4) can be communicatively coupled to a secure host tenancy 504 (e.g. the secure host tenancy 404 of FIG. 4) that can include a virtual cloud network (VCN) 506 (e.g. the VCN 406 of FIG. 4) and a secure host subnet 508 (e.g. the secure host subnet 408 of FIG. 4). The VCN 506 can include a local peering gateway (LPG) 510 (e.g. the LPG 410 of FIG. 4) that can be communicatively coupled to a secure shell (SSH) VCN 512 (e.g. the SSH VCN 412 of FIG. 4) via an LPG 410 contained in the SSH VCN 512. The SSH VCN 512 can include an SSH subnet 514 (e.g. the SSH subnet 414 of FIG. 4), and the SSH VCN 512 can be communicatively coupled to a control plane VCN 516 (e.g. the control plane VCN 416 of FIG. 4) via an LPG 510 contained in the control plane VCN 516. The control plane VCN 516 can be contained in a service tenancy 519 (e.g. the service tenancy 419 of FIG. 4), and the data plane VCN 518 (e.g. the data plane VCN 418 of FIG. 4) can be contained in a customer tenancy 521 that may be owned or operated by users, or customers, of the system.

The control plane VCN 516 can include a control plane DMZ tier 520 (e.g. the control plane DMZ tier 420 of FIG. 4) that can include LB subnet(s) 522 (e.g. LB subnet(s) 422 of FIG. 4), a control plane app tier 524 (e.g. the control plane app tier 424 of FIG. 4) that can include app subnet(s) 526 (e.g. app subnet(s) 426 of FIG. 4), a control plane data tier 528 (e.g. the control plane data tier 428 of FIG. 4) that can include database (DB) subnet(s) 530 (e.g. similar to DB subnet(s) 430 of FIG. 4). The LB subnet(s) 522 contained in the control plane DMZ tier 520 can be communicatively coupled to the app subnet(s) 526 contained in the control plane app tier 524 and an Internet gateway 534 (e.g. the Internet gateway 434 of FIG. 4) that can be contained in the control plane VCN 516, and the app subnet(s) 526 can be communicatively coupled to the DB subnet(s) 530 contained in the control plane data tier 528 and a service gateway 536 (e.g. the service gateway of FIG. 4) and a network address translation (NAT) gateway 538 (e.g. the NAT gateway 438 of FIG. 4). The control plane VCN 516 can include the service gateway 536 and the NAT gateway 538.

The control plane VCN 516 can include a data plane mirror app tier 540 (e.g. the data plane mirror app tier 440 of FIG. 4) that can include app subnet(s) 526. The app subnet(s) 526 contained in the data plane mirror app tier 540 can include a virtual network interface controller (VNIC) 542 (e.g. the VNIC of 442) that can execute a compute instance 544 (e.g. similar to the compute instance 444 of FIG. 4). The compute instance 544 can facilitate communication between the app subnet(s) 526 of the data plane mirror app tier 540 and the app subnet(s) 526 that can be contained in a data plane app tier 546 (e.g. the data plane app tier 446 of FIG. 4) via the VNIC 542 contained in the data plane mirror app tier 540 and the VNIC 542 contained in the data plane app tier 546.

The Internet gateway 534 contained in the control plane VCN 516 can be communicatively coupled to a metadata management service 552 (e.g. the metadata management service 452 of FIG. 4) that can be communicatively coupled to public Internet 554 (e.g. public Internet 454 of FIG. 4). Public Internet 554 can be communicatively coupled to the NAT gateway 538 contained in the control plane VCN 516. The service gateway 536 contained in the control plane VCN 516 can be communicatively couple to cloud services 556 (e.g. cloud services 456 of FIG. 4).

In some examples, the data plane VCN 518 can be contained in the customer tenancy 521. In this case, the IaaS provider may provide the control plane VCN 516 for each customer, and the IaaS provider may, for each customer, set up a unique compute instance 544 that is contained in the service tenancy 519. Each compute instance 544 may allow communication between the control plane VCN 516, contained in the service tenancy 519, and the data plane VCN 518 that is contained in the customer tenancy 521. The compute instance 544 may allow resources, that are provisioned in the control plane VCN 516 that is contained in the service tenancy 519, to be deployed or otherwise used in the data plane VCN 518 that is contained in the customer tenancy 521.

In other examples, the customer of the IaaS provider may have databases that live in the customer tenancy 521. In this example, the control plane VCN 516 can include the data plane mirror app tier 540 that can include app subnet(s) 526. The data plane mirror app tier 540 can reside in the data plane VCN 518, but the data plane mirror app tier 540 may not live in the data plane VCN 518. That is, the data plane mirror app tier 540 may have access to the customer tenancy 521, but the data plane mirror app tier 540 may not exist in the data plane VCN 518 or be owned or operated by the customer of the IaaS provider. The data plane mirror app tier 540 may be configured to make calls to the data plane VCN 518 but may not be configured to make calls to any entity contained in the control plane VCN 516. The customer may desire to deploy or otherwise use resources in the data plane VCN 518 that are provisioned in the control plane VCN 516, and the data plane mirror app tier 540 can facilitate the desired deployment, or other usage of resources, of the customer.

In some embodiments, the customer of the IaaS provider can apply filters to the data plane VCN 518. In this embodiment, the customer can determine what the data plane VCN 518 can access, and the customer may restrict access to public Internet 554 from the data plane VCN 518. The IaaS provider may not be able to apply filters or otherwise control access of the data plane VCN 518 to any outside networks or databases. Applying filters and controls by the customer onto the data plane VCN 518, contained in the customer tenancy 521, can help isolate the data plane VCN 518 from other customers and from public Internet 554.

In some embodiments, cloud services 556 can be called by the service gateway 536 to access services that may not exist on public Internet 554, on the control plane VCN 516, or on the data plane VCN 518. The connection between cloud services 556 and the control plane VCN 516 or the data plane VCN 518 may not be live or continuous. Cloud services 556 may exist on a different network owned or operated by the IaaS provider. Cloud services 556 may be configured to receive calls from the service gateway 536 and may be configured to not receive calls from public Internet 554. Some cloud services 556 may be isolated from other cloud services 556, and the control plane VCN 516 may be isolated from cloud services 556 that may not be in the same region as the control plane VCN 516. For example, the control plane VCN 516 may be located in "Region 1," and cloud service "Deployment 4," may be located in Region 1 and in "Region 2." If a call to Deployment 4 is made by the service gateway 536 contained in the control plane VCN 516 located in Region 1, the call may be transmitted to Deployment 4 in Region 1. In this example, the control plane VCN 516, or Deployment 4 in Region 1, may not be communicatively coupled to, or otherwise in communication with, Deployment 4 in Region 2.

Figure 6:
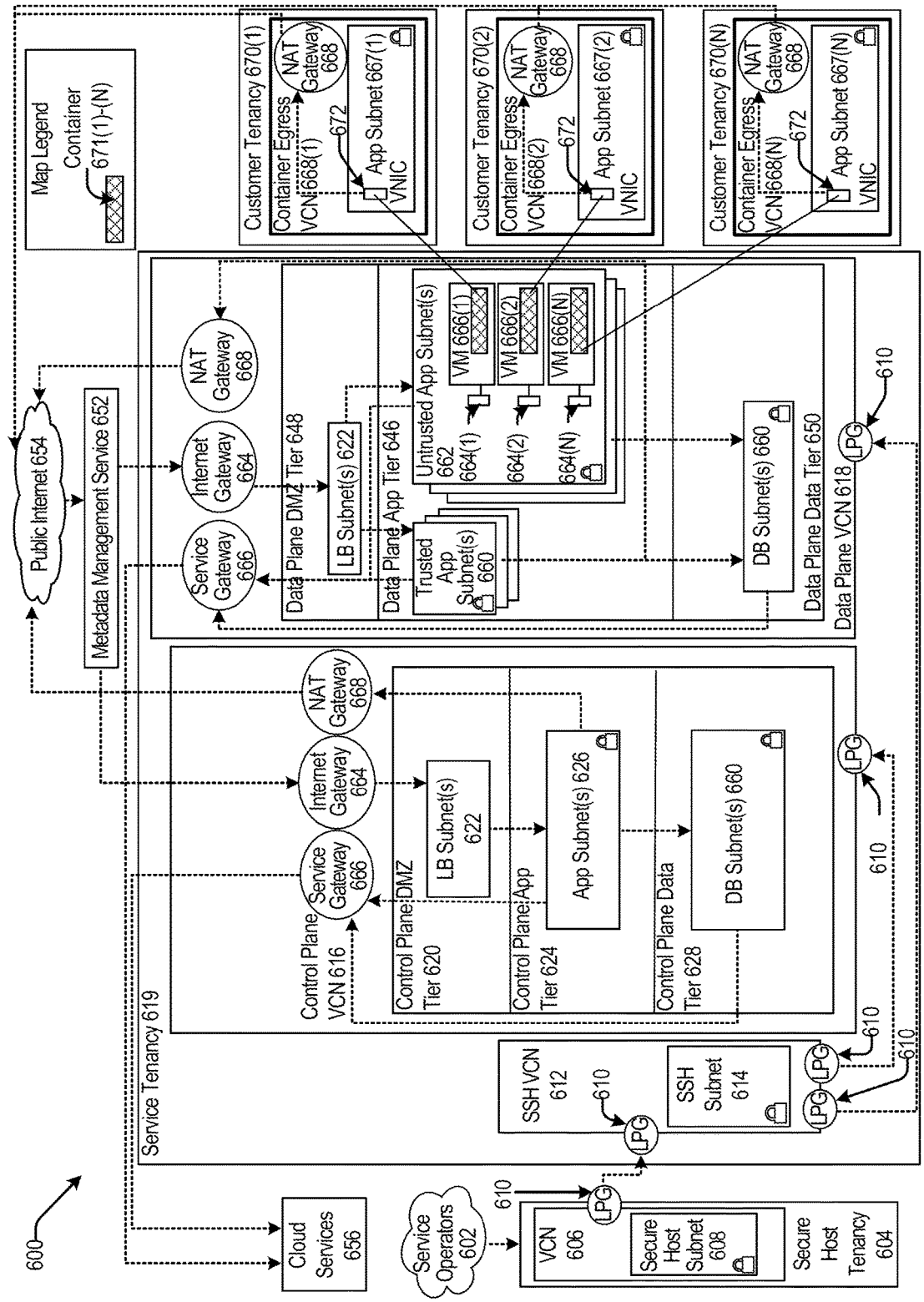
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g. service operators 402 of FIG. 4) can be communicatively coupled to a secure host tenancy 604 (e.g. the secure host tenancy 404 of FIG. 4) that can include a virtual cloud network (VCN) 606 (e.g. the VCN 406 of FIG. 4) and a secure host subnet 608 (e.g. the secure host subnet 408 of FIG. 4). The VCN 606 can include an LPG 610 (e.g. the LPG 410 of FIG. 4) that can be communicatively coupled to an SSH VCN 612 (e.g. the SSH VCN 412 of FIG. 4) via an LPG 610 contained in the SSH VCN 612. The SSH VCN 612 can include an SSH subnet 614 (e.g. the SSH subnet 414 of FIG. 4), and the SSH VCN 612 can be communicatively coupled to a control plane VCN 616 (e.g. the control plane VCN 416 of FIG. 4) via an LPG 610 contained in the control plane VCN 616 and to a data plane VCN 618 (e.g. the data plane 418 of FIG. 4) via an LPG 610 contained in the data plane VCN 618. The control plane VCN 616 and the data plane VCN 618 can be contained in a service tenancy 619 (e.g. the service tenancy 419 of FIG. 4).

The control plane VCN 616 can include a control plane DMZ tier 620 (e.g. the control plane DMZ tier 420 of FIG. 4) that can include load balancer (LB) subnet(s) 622 (e.g. LB subnet(s) 422 of FIG. 4), a control plane app tier 624 (e.g. the control plane app tier 424 of FIG. 4) that can include app subnet(s) 626 (e.g. similar to app subnet(s) 426 of FIG. 4), a control plane data tier 628 (e.g. the control plane data tier 428 of FIG. 4) that can include DB subnet(s) 630. The LB subnet(s) 622 contained in the control plane DMZ tier 620 can be communicatively coupled to the app subnet(s) 626 contained in the control plane app tier 624 and to an Internet gateway 634 (e.g. the Internet gateway 434 of FIG. 4) that can be contained in the control plane VCN 616, and the app subnet(s) 626 can be communicatively coupled to the DB subnet(s) 630 contained in the control plane data tier 628 and to a service gateway 636 (e.g. the service gateway of FIG. 4) and a network address translation (NAT) gateway 638 (e.g. the NAT gateway 438 of FIG. 4). The control plane VCN 616 can include the service gateway 636 and the NAT gateway 638.

The data plane VCN 618 can include a data plane app tier 646 (e.g. the data plane app tier 446 of FIG. 4), a data plane DMZ tier 648 (e.g. the data plane DMZ tier 448 of FIG. 4), and a data plane data tier 650 (e.g. the data plane data tier 450 of FIG. 4). The data plane DMZ tier 648 can include LB subnet(s) 622 that can be communicatively coupled to trusted app subnet(s) 660 and untrusted app subnet(s) 662 of the data plane app tier 646 and the Internet gateway 634 contained in the data plane VCN 618. The trusted app subnet(s) 660 can be communicatively coupled to the service gateway 636 contained in the data plane VCN 618, the NAT gateway 638 contained in the data plane VCN 618, and DB subnet(s) 630 contained in the data plane data tier 650. The untrusted app subnet(s) 662 can be communicatively coupled to the service gateway 636 contained in the data plane VCN 618 and DB subnet(s) 630 contained in the data plane data tier 650. The data plane data tier 650 can include DB subnet(s) 630 that can be communicatively coupled to the service gateway 636 contained in the data plane VCN 618.

The untrusted app subnet(s) 662 can include one or more primary VNICs 664(1)-(N) that can be communicatively coupled to tenant virtual machines (VMs) 666(1)-(N). Each tenant VM 666(1)-(N) can be communicatively coupled to a respective app subnet 667(1)-(N) that can be contained in respective container egress VCNs 668(1)-(N) that can be contained in respective customer tenancies 670(1)-(N). Respective secondary VNICs 672(1)-(N) can facilitate communication between the untrusted app subnet(s) 662 contained in the data plane VCN 618 and the app subnet contained in the container egress VCNs 668(1)-(N). Each container egress VCNs 668(1)-(N) can include a NAT gateway 638 that can be communicatively coupled to public Internet 654 (e.g. public Internet 454 of FIG. 4).

The Internet gateway 634 contained in the control plane VCN 616 and contained in the data plane VCN 618 can be communicatively coupled to a metadata management service 652 (e.g. the metadata management system 452 of FIG. 4) that can be communicatively coupled to public Internet 654. Public Internet 654 can be communicatively coupled to the NAT gateway 638 contained in the control plane VCN 616 and contained in the data plane VCN 618. The service gateway 636 contained in the control plane VCN 616 and contained in the data plane VCN 618 can be communicatively couple to cloud services 656.

In some embodiments, the data plane VCN 618 can be integrated with customer tenancies 670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 646. Code to run the function may be executed in the VMs 666(1)-(N), and the code may not be configured to run anywhere else on the data plane VCN 618. Each VM 666(1)-(N) may be connected to one customer tenancy 670. Respective containers 671(1)-(N) contained in the VMs 666(1)-(N) may be configured to run the code. In this case, there can be a dual isolation (e.g., the containers 671(1)-(N) running code, where the containers 671(1)-(N) may be contained in at least the VM 666(1)-(N) that are contained in the untrusted app subnet(s) 662), which may help prevent incorrect or otherwise undesirable code from damaging the network of the IaaS provider or from damaging a network of a different customer. The containers 671(1)-(N) may be communicatively coupled to the customer tenancy 670 and may be configured to transmit or receive data from the customer tenancy 670. The containers 671(1)-(N) may not be configured to transmit or receive data from any other entity in the data plane VCN 618. Upon completion of running the code, the IaaS provider may kill or otherwise dispose of the containers 671(1)-(N).

In some embodiments, the trusted app subnet(s) 660 may run code that may be owned or operated by the IaaS provider. In this embodiment, the trusted app subnet(s) 660 may be communicatively coupled to the DB subnet(s) 630 and be configured to execute CRUD operations in the DB subnet(s) 630. The untrusted app subnet(s) 662 may be communicatively coupled to the DB subnet(s) 630, but in this embodiment, the untrusted app subnet(s) may be configured to execute read operations in the DB subnet(s) 630. The containers 671(1)-(N) that can be contained in the VM 666(1)-(N) of each customer and that may run code from the customer may not be communicatively coupled with the DB subnet(s) 630.

In other embodiments, the control plane VCN 616 and the data plane VCN 618 may not be directly communicatively coupled. In this embodiment, there may be no direct communication between the control plane VCN 616 and the data plane VCN 618. However, communication can occur indirectly through at least one method. An LPG 610 may be established by the IaaS provider that can facilitate communication between the control plane VCN 616 and the data plane VCN 618. In another example, the control plane VCN 616 or the data plane VCN 618 can make a call to cloud services 656 via the service gateway 636. For example, a call to cloud services 656 from the control plane VCN 616 can include a request for a service that can communicate with the data plane VCN 618.

Figure 7:
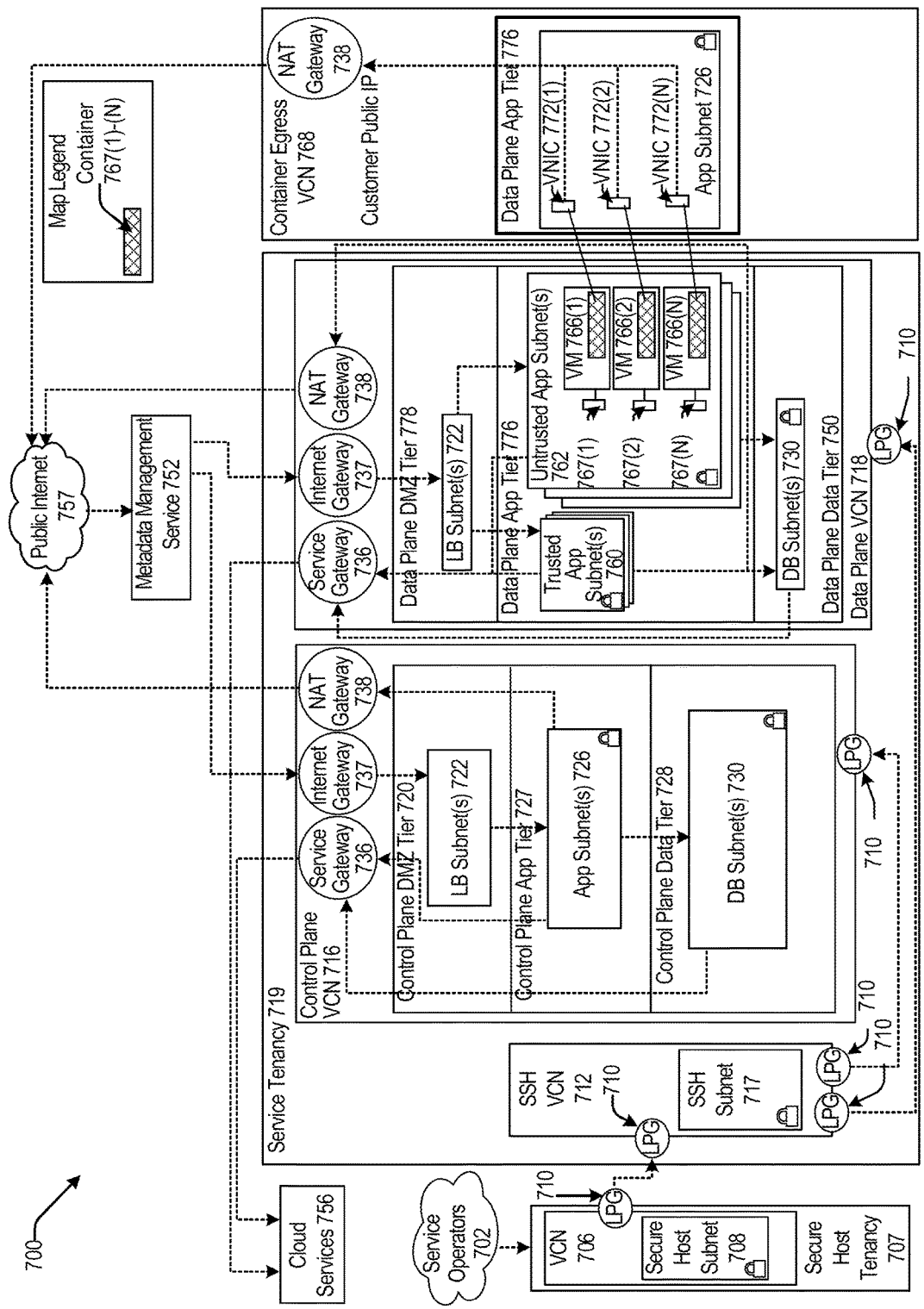
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 402 of FIG. 4) can be communicatively coupled to a secure host tenancy 704 (e.g. the secure host tenancy 404 of FIG. 4) that can include a virtual cloud network (VCN) 706 (e.g. the VCN 406 of FIG. 4) and a secure host subnet 708 (e.g. the secure host subnet 408 of FIG. 4). The VCN 706 can include an LPG 710 (e.g. the LPG 410 of FIG. 4) that can be communicatively coupled to an SSH VCN 712 (e.g. the SSH VCN 412 of FIG. 4) via an LPG 710 contained in the SSH VCN 712. The SSH VCN 712 can include an SSH subnet 714 (e.g. the SSH subnet 414 of FIG. 4), and the SSH VCN 712 can be communicatively coupled to a control plane VCN 716 (e.g. the control plane VCN 416 of FIG. 4) via an LPG 710 contained in the control plane VCN 716 and to a data plane VCN 718 (e.g. the data plane 418 of FIG. 4) via an LPG 710 contained in the data plane VCN 718. The control plane VCN 716 and the data plane VCN 718 can be contained in a service tenancy 719 (e.g. the service tenancy 419 of FIG. 4).

The control plane VCN 716 can include a control plane DMZ tier 720 (e.g. the control plane DMZ tier 420 of FIG. 4) that can include LB subnet(s) 722 (e.g. LB subnet(s) 422 of FIG. 4), a control plane app tier 724 (e.g. the control plane app tier 424 of FIG. 4) that can include app subnet(s) 726 (e.g. app subnet(s) 426 of FIG. 4), a control plane data tier 728 (e.g. the control plane data tier 428 of FIG. 4) that can include DB subnet(s) 730 (e.g. DB subnet(s) 630 of FIG. 6). The LB subnet(s) 722 contained in the control plane DMZ tier 720 can be communicatively coupled to the app subnet(s) 726 contained in the control plane app tier 724 and to an Internet gateway 734 (e.g. the Internet gateway 434 of FIG. 4) that can be contained in the control plane VCN 716, and the app subnet(s) 726 can be communicatively coupled to the DB subnet(s) 730 contained in the control plane data tier 728 and to a service gateway 736 (e.g. the service gateway of FIG. 4) and a network address translation (NAT)

gateway 738 (e.g. the NAT gateway 438 of FIG. 4). The control plane VCN 716 can include the service gateway 736 and the NAT gateway 738.

The data plane VCN 718 can include a data plane app tier 746 (e.g. the data plane app tier 446 of FIG. 4), a data plane DMZ tier 748 (e.g. the data plane DMZ tier 448 of FIG. 4), and a data plane data tier 750 (e.g. the data plane data tier 450 of FIG. 4). The data plane DMZ tier 748 can include LB subnet(s) 722 that can be communicatively coupled to trusted app subnet(s) 760 (e.g. trusted app subnet(s) 660 of FIG. 6) and untrusted app subnet(s) 762 (e.g. untrusted app subnet(s) 662 of FIG. 6) of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include primary VNICs 764(1)-(N) that can be communicatively coupled to tenant virtual machines (VMs) 766(1)-(N) residing within the untrusted app subnet(s) 762. Each tenant VM 766(1)-(N) can run code in a respective container 767(1)-(N), and be communicatively coupled to an app subnet 726 that can be contained in a data plane app tier 746 that can be contained in a container egress VCN 768. Respective secondary VNICs 772(1)-(N) can facilitate communication between the untrusted app subnet(s) 762 contained in the data plane VCN 718 and the app subnet contained in the container egress VCN 768. The container egress VCN can include a NAT gateway 738 that can be communicatively coupled to public Internet 754 (e.g. public Internet 454 of FIG. 4).

The Internet gateway 734 contained in the control plane VCN 716 and contained in the data plane VCN 718 can be communicatively coupled to a metadata management service 752 (e.g. the metadata management system 452 of FIG. 4) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some examples, the pattern illustrated by the architecture of block diagram 700 of FIG. 7 may be considered an exception to the pattern illustrated by the architecture of block diagram 600 of FIG. 6 and may be desirable for a customer of the IaaS provider if the IaaS provider cannot directly communicate with the customer (e.g., a disconnected region). The respective containers 767(1)-(N) that are contained in the VMs 766(1)-(N) for each customer can be accessed in real-time by the customer. The containers 767(1)-(N) may be configured to make calls to respective secondary VNICs 772(1)-(N) contained in app subnet(s) 726 of the data plane app tier 746 that can be contained in the container egress VCN 768. The secondary VNICs 772(1)-(N) can transmit the calls to the NAT gateway 738 that may transmit the calls to public Internet 754. In this example, the containers 767(1)-(N) that can be accessed in real-time by the customer can be isolated from the control plane VCN 716 and can be isolated from other entities contained in the data plane VCN 718. The containers 767(1)-(N) may also be isolated from resources from other customers.

In other examples, the customer can use the containers 767(1)-(N) to call cloud services 756. In this example, the customer may run code in the containers 767(1)-(N) that requests a service from cloud services 756. The containers 767(1)-(N) can transmit this request to the secondary VNICs 772(1)-(N) that can transmit the request to the NAT gateway that can transmit the request to public Internet 754. Public Internet 754 can transmit the request to LB subnet(s) 722 contained in the control plane VCN 716 via the Internet gateway 734. In response to determining the request is valid, the LB subnet(s) can transmit the request to app subnet(s) 726 that can transmit the request to cloud services 756 via the service gateway 736.

It should be appreciated that IaaS architectures 400, 500, 600, 700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 8:
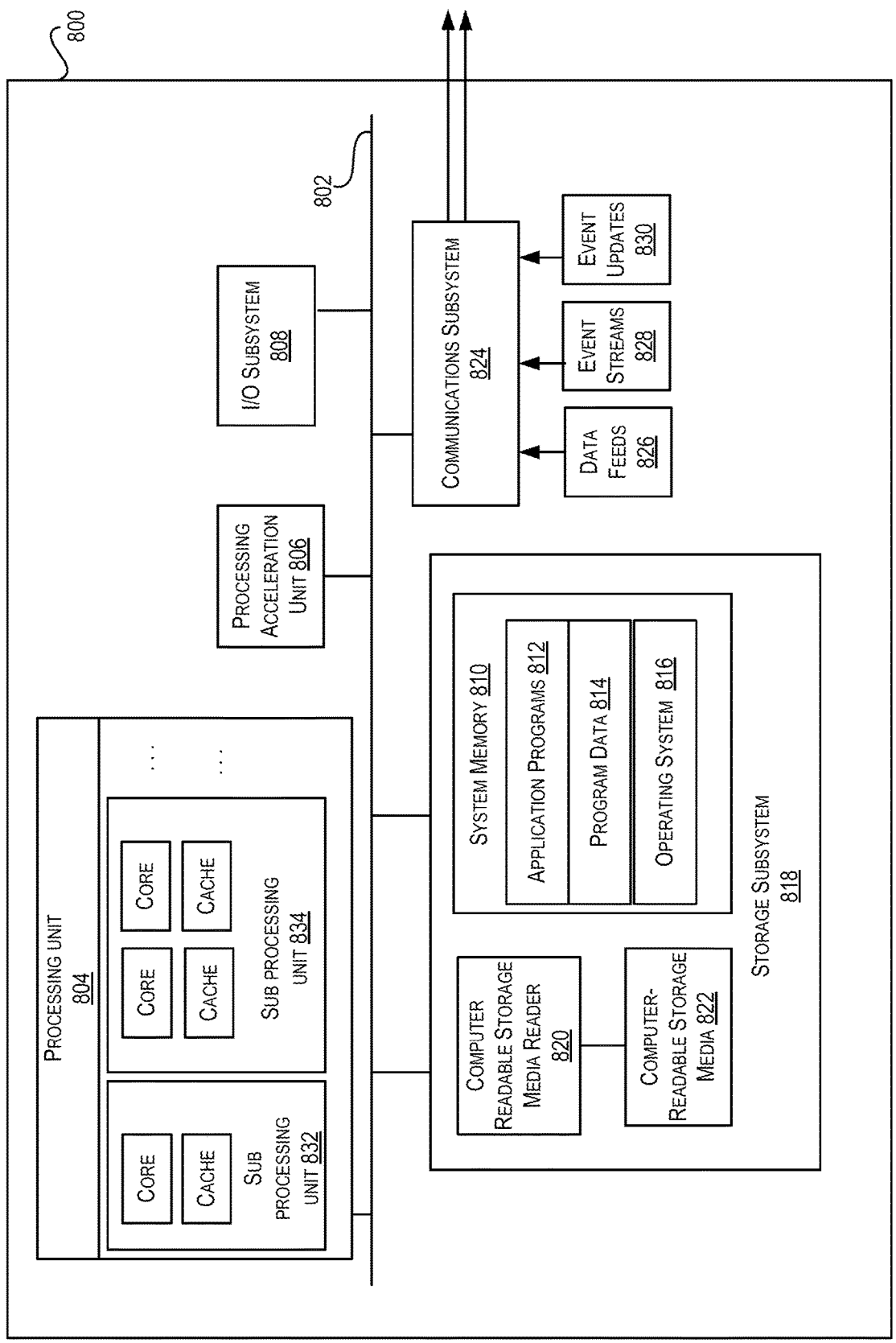
FIG. 8 is a block diagram illustrating an example computer system, according to at least one embodiment.

FIG. 8 illustrates an example computer system 800, in which various embodiments may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present disclosure.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
receiving, by a computing system, a forecast request, the forecast request identifying a forecast to be made for a future time point, and the forecast request comprising a time series dataset to be used for making the requested forecast, the time series dataset comprising a plurality of data points, each data point in the plurality of data points comprising a value and an associated time point;
selecting, by the computing system, a model to be used for making the requested forecast;
determining, by the computing system, a set of one or more attributes of the time series dataset;
based on the set of one or more attributes, selecting, by the computing system, a compute instance having a shape to be used for training the selected model to be used for making the requested forecast; and
training, by the computing system, the selected model using the compute instance having the selected shape and the time series dataset to generate a trained model.

2. The method of claim 1, wherein selecting, by the computing system, the model to be used for making the requested forecast is based on the time series dataset to be used for making the requested forecast and a plurality of model selection rules.

3. The method of claim 1, wherein the set of one or more attributes of the training dataset comprise a size of the time series dataset and a number of columns in the time series dataset.

4. The method of claim 1, wherein selecting by the computing system, the compute instance having the shape is based on the set of one or more attributes of the training dataset and a plurality of compute instance shape rules.

5. The method of claim 1, further comprising determining, by the computing system, whether the selected model is to be trained using a compute instance that is dedicated for training the model or using a compute instance that is sharable for training multiple models including the model.

6. The method of claim 5, wherein, upon determining that the model is to be trained using a compute instance that is dedicated for training the model:
provisioning a new compute instance having the selected shape; and
wherein training the model using the compute instance comprises using the new compute instance exclusively for training the model.

7. The method of claim 5, wherein, upon determining that the model is to be trained using a compute instance that is sharable:
identifying, from a set of pre-provisioned compute instances, a particular compute instance having the selected shape; and
wherein using the compute instance comprises using the particular compute instance for training the model.

8. The method of claim 1, wherein the shape of the compute instance represents a set of resources allocated to the compute instance, wherein the set of resources comprise central processing units (CPUs), memory, block storage capacity and network bandwidth allocated to the computing instance.

9. The method of claim 1, further comprising:
generating, by the computing system, a forecast result for the future time point using the trained model; and
providing, by the computing system, the forecast result as a response to the forecast request.

10. The method of claim 1, wherein the compute instance is a virtual machine, a bare metal instance or a container.

11. An forecasting service system comprising:
a memory; and
one or more processors configured to perform processing, the processing comprising:
receiving a forecast request, the forecast request identifying a forecast to be made for a future time point, and the forecast request comprising a time series dataset to be used for making the requested forecast, the time series dataset comprising a plurality of data points, each data point in the plurality of data points comprising a value and an associated time point;

selecting a model to be used for making the requested forecast;

determining a set of one or more attributes of the time series dataset;

based on the set of one or more attributes, selecting a compute instance having a shape to be used for training the selected model to be used for making the requested forecast; and training the selected model using the compute instance having the selected shape and the time series dataset to generate a trained model.

12. The system of claim 11, wherein selecting the model to be used for making the requested forecast is based on the time series dataset to be used for making the requested forecast and a plurality of model selection rules.

13. The system of claim 11, wherein the set of one or more attributes of the training dataset comprise a size of the time series dataset and a number of columns in the time series dataset.

14. The system of claim 11, further comprising determining whether the selected model is to be trained using a compute instance that is dedicated for training the model or using a compute instance that is sharable for training multiple models including the model.

15. The system of claim 14, wherein, upon determining that the model is to be trained using a compute instance that is dedicated for training the model:

provisioning a new compute instance having the selected shape; and wherein training the model using the compute instance comprises using the new compute instance exclusively for training the model.

16. The system of claim 14, wherein, upon determining that the model is to be trained using a compute instance that is sharable:

identifying, from a set of pre-provisioned compute instances, a particular compute instance having the selected shape; and wherein using the compute instance comprises using the particular compute instance for training the model.

17. The system of claim 11 further comprising:

generating, by the computing system, a forecast result for the future time point using the trained model; and providing, by the computing system, the forecast result as a response to the forecast request.

18. A non-transitory computer-readable medium having program code that is stored thereon, the program code executable by one or more processing devices for performing operations comprising:

receiving a forecast request, the forecast request identifying a forecast to be made for a future time point, and the forecast request comprising a time series dataset to be used for making the requested forecast, the time series dataset comprising a plurality of data points, each data point in the plurality of data points comprising a value and an associated time point;

selecting a model to be used for making the requested forecast;

determining a set of one or more attributes of the time series dataset;

based on the set of one or more attributes, selecting a compute instance having a shape to be used for training the selected model to be used for making the requested forecast; and training the selected model using the compute instance having the selected shape and the time series dataset to generate a trained model.

19. The non-transitory computer-readable medium of claim 18, wherein the set of one or more attributes of the training dataset comprise a size of the time series dataset and a number of columns in the time series dataset.

20. The non-transitory computer-readable medium of claim 18, further comprising determining whether the selected model is to be trained using a compute instance that is dedicated for training the model or using a compute instance that is sharable for training multiple models including the model.

* * * * *

UNITED STATES PATENT AND TRADEMARK OFFICE
CERTIFICATE OF CORRECTION

| | | |
|---|---|---|
| PATENT NO. | : 12,032,986 B2 | |
| APPLICATION NO. | : 17/490762 | |
| DATED | : July 9, 2024 | |
| INVENTOR(S) | : Agrawal | |

It is certified that error appears in the above-identified patent and that said Letters Patent is hereby corrected as shown below:

In the Drawings

On sheet 3 of 8, in FIG. 3, under reference numeral 300, Line 7, delete "storagecapacity," and insert -- storage capacity, --, therefor.

On sheet 3 of 8, in FIG. 3, under reference numeral 300, Line 14, delete "storagecapacity," and insert -- storage capacity, --, therefor.

On sheet 3 of 8, in FIG. 3, under reference numeral 300, Line 21, delete "storagecapacity," and insert -- storage capacity, --, therefor.

On sheet 3 of 8, in FIG. 3, under reference numeral 300, Line 28, delete "storagecapacity," and insert -- storage capacity, --, therefor.

In the Specification

In Column 2, Line 65, delete "FFS" and insert -- FSS --, therefor.

In Column 4, Line 61, delete "FFS" and insert -- FSS --, therefor.

In Column 5, Line 6, delete "FFS" and insert -- FSS --, therefor.

In Column 5, Line 10, delete "FFS" and insert -- FSS --, therefor.

In Column 5, Line 13, delete "FFS" and insert -- FSS --, therefor.

In Column 5, Line 18, delete "FFS" and insert -- FSS --, therefor.

In Column 6, Line 55, delete "FFS" and insert -- FSS --, therefor.

Signed and Sealed this
Tenth Day of December, 2024

Katherine Kelly Vidal
*Director of the United States Patent and Trademark Office*

CERTIFICATE OF CORRECTION (continued)
U.S. Pat. No. 12,032,986 B2

In Column 8, Line 38, delete "FFS" and insert -- FSS --, therefor.

In Column 8, Line 39, delete "FFS" and insert -- FSS --, therefor.

In Column 9, Line 61, delete "FFS" and insert -- FSS --, therefor.